Patented Mar. 7, 1933

1,900,670

UNITED STATES PATENT OFFICE

OTTO STÅLHANE, OF STOCKHOLM, SWEDEN

CEMENT OR MATERIALS CONTAINING CEMENT

No Drawing. Application filed April 23, 1930, Serial No. 446,797, and in Sweden April 27, 1929.

The present invention relates to the production of hydraulic binding cement or mixtures of cement and articles made of such materials.

The chief object of the present invention is to provide a cement, or mixture of cements, which hardens more rapidly, and yet is less soluble in water, than the cement or mixtures of cement hitherto used. Besides this, the cementitious product according to the present invention will, at least under certain conditions, be cheaper to produce than has hitherto been the case with the unimproved cements.

According to the present invention, arsenious acid ($As_2O_3$), or materials containing arsenious acid, are added to the cement or the mixture of cement, for instance, to Portland cement, to so-called "melt-cement", to slag-cement, Roman-cement, or to other suitable kinds of cements, or mixtures containing cement. The other ingredients or materials commonly used in cement or mixtures of cement may, of course, also be added without departing from the idea of the invention. My experiments have proved that through the admixture of arsenious acid ($As_2O_3$) (or material containing arsenious acid), the solubility in water of the cement when hardened is rendered exceedingly low, particularly when the content of arsenious acid added amounts to from 20 up to 50% $As_2O_3$ calculated on the weight of the cement or the weight of the cement contained in the mixture of cement, such as for instance cement-concrete, cement-mortar or the like materials. The admixture of the arsenious acid, or of the material containing arsenious acid, in the cement or mixture of cement, may take place either before, during or after the grinding of the cement or mixture of cement. The expression "mixture" of cement or material containing cement as used in this specification and the following claims, comprises all mixtures, materials and masses intended for technical use in which cement is contained as an essential ingredient. Also in mixtures of cement, for instance such as used in the manufacture of cement-concrete, cement-mortar or other mixtures intended for the production of certain articles, the arsenious acid or material containing arsenious acid may be mixed with the cement proper before the production of the mixture of cement, or the arsenious acid or material containing arsenious acid may be mixed with the other ingredients before the admixtion of the cement to the said ingredients, or generally speaking, the material containing arsenious acid may be mixed with the other ingredients at any stage of the process for the production of the ready mixture.

In order to increase the strength of the ready cement or the cement-concrete it is in some cases suitable to add to the cement or mixture of cement in question, besides arsenious acid or material containing arsenious acid, also a suitable amount of basic material preferably lime (burnt, slaked or unslaked) which together with the arsenious acid forms hardening arsenites for instance in case of lime calcium arsenite. In certain cases it might be suitable to mix the lime and the arsenious acid or the material containing arsenious acid before they are added to the cement or the mixture of the cement in question.

Having thus described my invention I declare that what I claim is:—

1. A hydraulic binding material consisting of common cement and containing arsenious acid in a proportion of about 50% by weight of arsenious acid calculated on the weight of the cement.

2. A hydraulic binding material containing common cement and arsenious acid in a proportion of about 50% by weight of arsenious acid calculated on the weight of the cement contained in the material.

In testimony whereof I affix my signature.

OTTO STÅLHANE.